United States Patent
Gottshall et al.

[11] Patent Number: 5,940,782
[45] Date of Patent: Aug. 17, 1999

[54] METHOD OF CALIBRATING A LINEAR DRIVER SYSTEM

[75] Inventors: Paul C. Gottshall, Washington; Brian G. McGee, Chillicothe, both of Ill.

[73] Assignee: Caterpillar Inc., Peoria, Ill.

[21] Appl. No.: 08/873,881

[22] Filed: May 12, 1997

[51] Int. Cl.[6] .................................................. G01B 7/14
[52] U.S. Cl. ........................ 702/107; 702/108; 327/407
[58] Field of Search ...................... 702/107; 324/207.16, 324/654, 207.24, 236; 327/407; 361/18, 86

[56] References Cited

U.S. PATENT DOCUMENTS

| | | | |
|---|---|---|---|
| 4,661,766 | 4/1987 | Hoffman et al. | 323/287 |
| 5,467,240 | 11/1995 | Williamson et al. | 361/18 |
| 5,481,187 | 1/1996 | Marcott et al. | 324/207.16 |
| 5,578,904 | 11/1996 | Marcott et al. | 324/207.16 |
| 5,600,237 | 2/1997 | Nippert | 324/207.16 |
| 5,748,019 | 5/1998 | Wong et al. | 327/170 |

*Primary Examiner*—Kamini Shah
*Attorney, Agent, or Firm*—Mike Nieberding

[57] ABSTRACT

A method of calibrating a linear driver system including a linear driver circuit, logic means connected to an input line of the linear driver circuit, and information storage means associated with the logic means, involves testing the linear driver circuit once assembled. A predetermined test load and a test electrical energy source are connected to the linear driver circuit. A first input test voltage is applied to the input line of the linear driver circuit and a corresponding first current level through the test load is measured. A second input test voltage is applied to the input line of the linear driver circuit and a corresponding second current level through the test load is measured. The two measured current levels are stored in the information storage means for later retrieval during operation of the linear driver system.

14 Claims, 2 Drawing Sheets

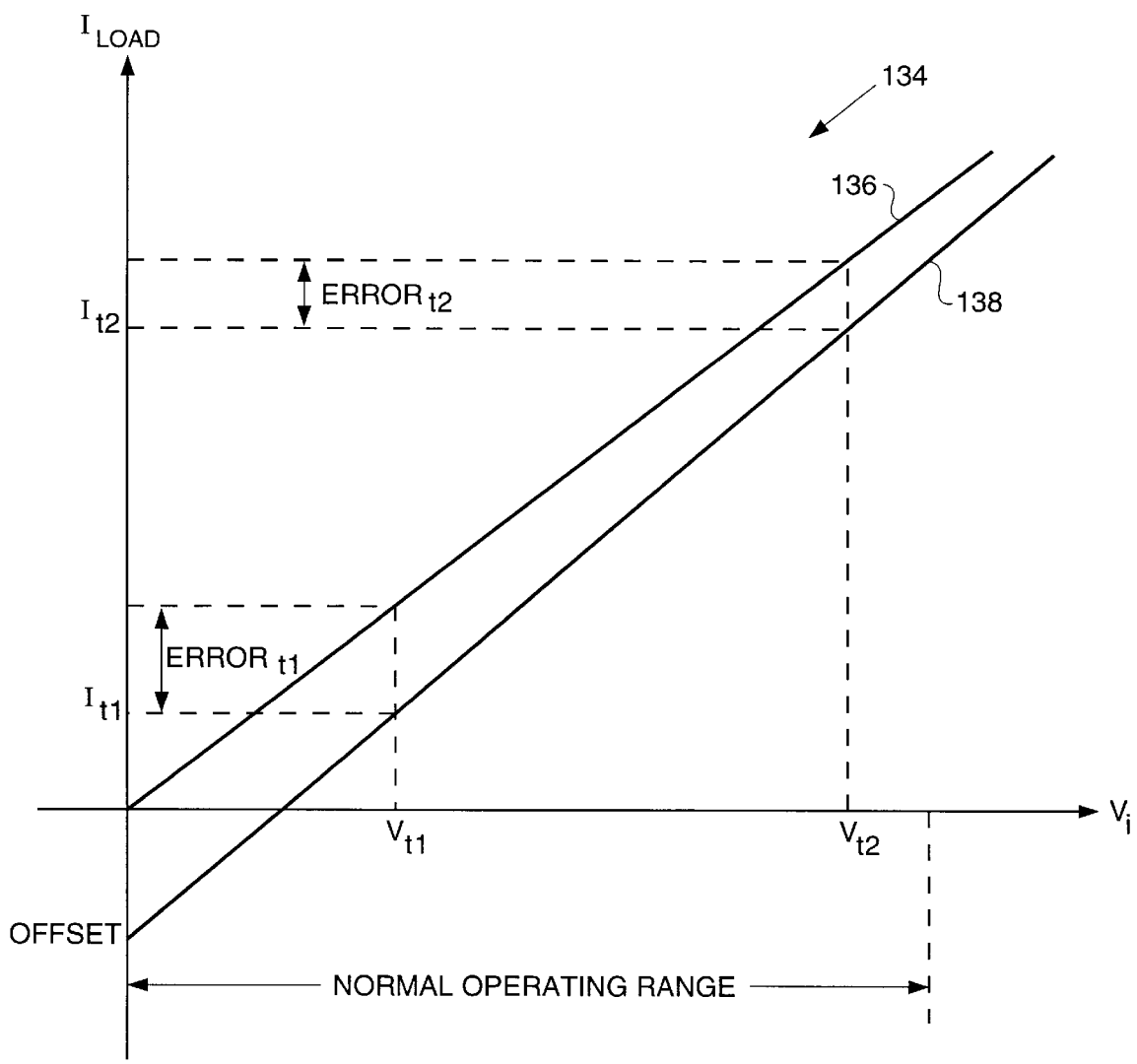

5,940,782

METHOD OF CALIBRATING A LINEAR DRIVER SYSTEM

TECHNICAL FIELD

This invention relates generally to linear driver circuits and, more particularly, to a method of calibrating a linear driver system so as to achieve improved system accuracy.

BACKGROUND ART

Driver circuits are commonly utilized to control the delivery of current from an electrical energy source to a load. A linear driver system includes a linear driver circuit which, in response to an input voltage, delivers a current to a connected load, which current is proportional to the magnitude of the input voltage. A linear driver system typically includes logic means operable to provide the input voltage to the linear driver circuit. Due to variations in components used to build linear driver circuits, some difference or error between the current actually delivered for a given input voltage and the current expected to be delivered for the given input voltage generally exists.

In certain applications such error is unacceptable. For example, in some hydraulic systems utilized in heavy machinery, precision control of a hydraulic rail pressure utilizing a linear driver system is necessary. Such precision control has previously been achieved by assembling linear driver circuits with more precise and correspondingly more expensive components in order to reduce system error. Linear driver circuits have also been tested during manufacture to assure that they fall within required specifications. In the past, even where more precise components were utilized, some linear driver circuits would not fall within required specifications and would therefore have to be reworked with different components, or even scrapped, increasing manufacturing costs.

Accordingly, the present invention is directed to overcoming one or more of the problems as set forth above.

DISCLOSURE OF THE INVENTION

In one aspect of the present invention a method of calibrating a linear driver system including a linear driver circuit, logic means connected to an input line of the linear driver circuit, and information storage means associated with the logic means, involves testing the linear driver circuit once assembled. A predetermined test load and a test electrical energy source are connected to the linear driver circuit. A first input test voltage is applied to the input line of the linear driver circuit and a corresponding first current level through the test load in response thereto is measured. A second input test voltage is applied to the input line of the linear driver circuit and a corresponding second current level through the test load in response thereto is measured. The two measured current levels are stored in the information storage means for later retrieval during operation of the linear driver system.

BRIEF DESCRIPTION OF DRAWINGS

For a better understanding of the present invention, reference may be made to the accompanying drawings in which:

FIG. 2 is a graph showing exemplary plots of the load current verses the input voltage for the linear driver circuit of FIG. 1.

BEST MODE FOR CARRYING OUT THE INVENTION

Figure 1:
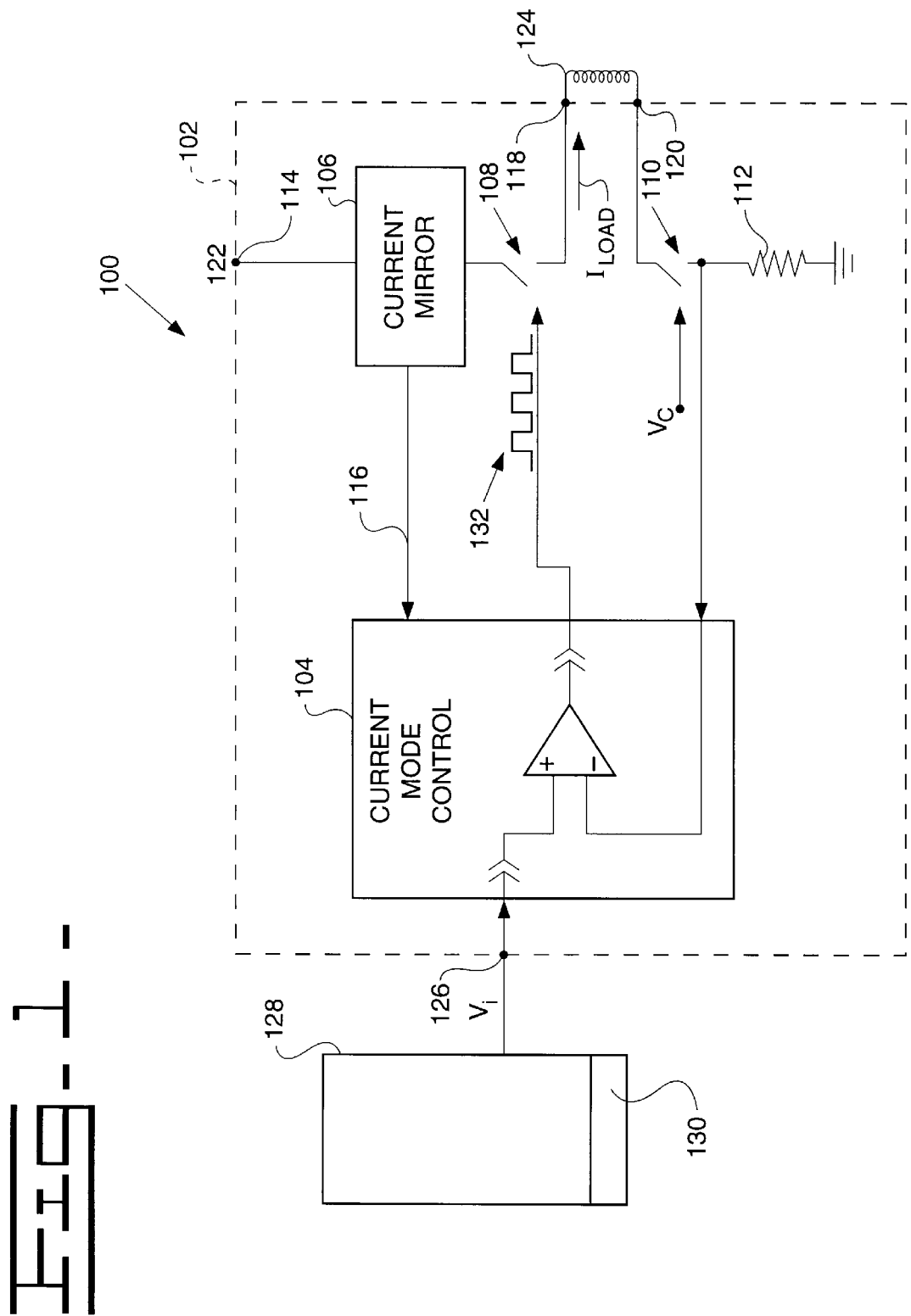
FIG. 1 is a schematic illustration of a linear driver system including a linear driver circuit.

Referring now to the drawings, FIG. 1 identifies a linear driver system 100 including a linear driver circuit 102. The linear driver circuit 102 includes a current mode control 104, a current mirror 106, transistors 108 and 110 illustrated generally as switches, and a sense resistor 112. The current mirror 106 includes an input line 114, and a line 116 may extend between the current mirror 106 and the current mode control 104 providing a voltage reference to the current mode control 104 for diagnostic purposes. The driver circuit 102 also includes two lines 118 and 120. When the linear driver system 100 is installed in a device for operation, an electrical energy source 122 of the device is connected to the line 114 and a load 124 of the device is connected across lines 118 and 120.

An input line 126 of the linear driver circuit 102 runs to the current mode control and is connected to logic means 128 which includes associated information storage means 130. For example, logic means 128 may be a microcontroller and the information storage means 130 may be EEPROM of the microcontroller, such EEPROM including a plurality of electronically addressable information storage locations.

During normal operation, logic means 128 provides an input voltage ($V_i$) to the input 126 of the linear driver circuit 102, which input voltage is applied to the current mode control 104. The current mode control 104 utilizes the applied input voltage, along with a voltage from the sense resistor 112, to output a pulse width modulated signal 132 which is applied to the transistor 108 to control the on/off switching thereof. A separate command voltage ($V_c$) is applied to the transistor 110 to control the on/off switching thereof. For the purpose of this discussion, transistor 110 is considered on. Accordingly, during normal operation, delivery of a load current ($I_{LOAD}$) to the load 124 is controlled by the pulse width modulated signal 132. The average current delivered to the load 124 can therefore be varied by varying the portion of the duty cycle during which the pulse of signal 132 is on. By increasing the portion of the duty cycle during which the pulse is on the average current through the load is increased, and by decreasing the portion of the duty cycle during which the pulse is on the average current through the load is decreased. The current mode control 104 utilizes the input voltage ($V_i$) to establish the portion of the duty cycle during which the pulse of signal 132 is on, such portion increasing as the input voltage ($V_i$) increases. Thus, the average load current ($I_{LOAD}$) is proportional to the input voltage ($V_i$).

Two exemplary plots of the load current ($I_{LOAD}$) verses the input voltage ($V_i$) are depicted in the graph 134 of FIG. 2. The plot represented by line 136 depicts an expected relationship between the load current and the input voltage assuming all components of the linear driver circuit 102 operate at nominal values. The plot represented by line 138 depicts an actual relationship between the load current and the input voltage that might result when the components of the linear driver circuit 102 do not operate at nominal values. The difference between the two plots represents the error of a linear driver system which the calibration method of the present invention addresses. Such calibration method compensates for the difference between the expected relationship and the actual relationship for a given linear driver system.

The linear driver system 100 is typically assembled on a PC board which is later installed in a device in which the system is utilized. By calibrating the linear driver system 100 after assembly, the accuracy of the linear driver system 100 is improved. Such calibration involves testing the linear driver circuit 102 in order to obtain values representative of line 138. In order to perform such testing, a predetermined test load is connected, at 118, to the linear driver circuit 102. Preferably, such predetermined test load is closely matched to the load which the linear driver system will be used to drive when installed in a device. A test electrical energy source is also connected, at 114, to the linear driver circuit 102 for the purpose of such testing. Such test electrical energy source may also be matched with the electrical energy source to which the linear driver system will be connected when installed.

A first input test voltage ($V_{t1}$) is then applied to the input 126 of the linear driver circuit 102 and a corresponding first current level ($I_{t1}$) through the test load is measured. A second input test voltage ($V_{t2}$) is then applied to the input 126 of the linear driver circuit 102 and a corresponding second current level ($I_{t2}$) through the test load is measured. Each of the measured current levels ($I_{t1}$) and ($I_{t2}$) are retrievably stored in the information storage means 130.

With respect to the input test voltages ($V_{t1}$) and ($V_{t2}$), such test voltages may be selected from a known normal operating range for which the linear driver circuit will be used when installed. With respect to the measurement of the current levels ($I_{t1}$) and ($I_{t2}$), because the current delivered to the test load will actually be a series of current pulses, such measurement will involve the measurement of the average current through the test load, and it is the average current levels which will be stored in the information storage means 130.

In operation, the logic means 128 is configured to determine an input voltage ($V_i$) necessary to deliver a desired current ($I_d$) through the load 124, and to utilize the stored current levels ($I_{t1}$) and ($I_{t2}$) in making such determination. For example, a programmable logic means, such as a microcontroller, may be programmed according to the line equation y=mx+b in order to make such determination, where m is a variable which represents the SLOPE of the line 138 and b is a variable which represents the OFFSET of the line 138 from the origin. The known predetermined test voltages ($V_{t1}$) and ($V_{t2}$) and the stored calibration current levels ($I_{t1}$) and ($I_{t2}$) give sufficient information to determine an equation for the line 138 of the following form:

$$I_{LOAD} = [\text{SLOPE} \times (V_i)] + \text{OFFSET}, \text{ where}$$

$$\text{SLOPE} = \frac{(I_{t1} - I_{t2})}{(V_{t1} - V_{t2})}, \text{ and,}$$

$$\text{OFFSET} = I_{t1} - \frac{(I_{t1} - I_{t2})(V_{t1})}{(V_{t1} - V_{t2})}.$$

Solving the equation for the input voltage ($V_i$), the logic means 128 may be programmed to determine the input voltage ($V_i$) necessary for a desired load current ($I_d$) as follows:

$$v_i = \frac{(I_d - \text{OFFSET})}{(\text{SLOPE})}$$

The logic means 128 may be pre-programmed with the predetermined test voltage values ($V_{t1}$) and ($V_{t2}$) incorporated in the programming thereof, and may further be programmed to refer to the locations within the information storage means 130 where the current level values ($I_{t1}$) and ($I_{t2}$) are stored. Accordingly, it is desirable to store each current level at a respective predetermined addressable location of the information storage means 130.

The calibration method described above can be achieved utilizing test equipment having the predetermined test load and test voltage incorporated therein. Such test equipment may further be programmed to determine and store the average current levels automatically. For example, if the logic means 128 is a microcontroller and the information storage means 130 is EEPROM of the microcontroller, the test equipment will include connections which enable it to electronically store the current levels ($I_{t1}$) and ($I_{t2}$) in the EEPROM. Further, the test equipment may also include a connection to the driver circuit 102 which provides a positive voltage to the transistor 110 in order to turn the transistor 110 on.

INDUSTRIAL APPLICABILITY

The above-described method results in a calibrated linear driver system which can be utilized to accurately deliver a desired current level ($I_d$) to a load by determining an input voltage ($V_i$) necessary to result in the desired current level. Because the linear driver system is calibrated, less precise and accordingly less expensive components may be utilized in constructing the linear driver circuit, reducing the manufacturing cost of the system.

The calibration method may advantageously be utilized in the assembly line setting where a large number of linear driver systems are being assembled, each typically formed on a respective PC board. The logic means 128 of each system can include identical programming which makes reference to the predetermined locations where the current levels ($I_{t1}$) and ($I_{t2}$) will be stored. After assembly, each PC board is tested in the aforementioned manner and the current levels ($I_{t1}$) and ($I_{t2}$) are then stored at their respective predetermined locations. Thus, after calibration, each linear driver system includes stored calibration current levels which are specific to the driver circuit thereof. The end result is that each linear driver system is calibrated to take into account its own component variations so that, when installed in a device, current levels delivered to an attached load can be more accurately controlled by each respective system.

Although the method provided herein has been described with reference to the illustrated linear driver circuit 102, it is understood that other linear driver circuit variations exist, or could be designed, for which the calibration method of the present invention would be equally applicable and advantageous. The exact configuration of the linear driver circuit utilized will determine the number and nature of the connections required during calibration.

Other aspects, objects and advantages of the present invention can be obtained from a study of the drawings, the disclosure and the appended claims.

We claim:

1. A method of calibrating a linear driver system including logic means operatively connected to an input line of a linear driver circuit, the linear driver circuit configured to deliver a current from an electrical energy source to a load when the electrical energy source and load are connected thereto, the level of the delivered current being proportional to an input voltage applied to the input line by the logic means, the logic means including information storage means associated therewith, the method comprising the steps of:

(a) assembling the linear driver circuit;

(b) connecting a predetermined test load to the linear driver circuit;

(c) connecting a test electrical energy source to the linear driver circuit;

(d) applying a first input test voltage to the input line of the linear driver circuit and measuring a corresponding first current level through the test load in response thereto;

(e) applying a second input test voltage to the input line of the linear driver circuit and measuring a corresponding second current level through the test load in response thereto;

(f) storing the first measured current level in the information storage means;

(g) storing the second measured current level in the information storage means and, (h) determining a relationship between the input voltage and the delivered current in response to said first and said second input test voltages and said corresponding first and second current levels, thereby calibrating said linear driver system.

2. The method, as set forth in claim 1, wherein the first input test voltage is a predetermined voltage and the second input test voltage is a predetermined voltage.

3. The method, as set forth in claim 2, wherein each predetermined voltage falls within a predefined range of operation of the linear driver circuit.

4. The method, as set forth in claim 1, wherein the information storage means includes a plurality of electronically addressable information storage locations, wherein in step (f) the first measured current level is stored at a first predetermined information storage location and in step (g) the second measured current level is stored at a second predetermined information storage location.

5. The method, as set forth in claim 1, wherein the linear driver circuit is configured to deliver a series of current pulses through the load connected thereto, wherein the current measuring in step (d) involves measuring an average current through the test load and the current measuring in step (e) involves measuring an average current through the test load.

6. The method, as set forth in claim 1, wherein the logic means is programmable, the method further comprising the step of:

(h) programming the logic means to determine an input voltage ($V_i$) which will result in the delivery of a desired current level ($I_d$) to an attached load in accordance with the equation:

$$V_i = \frac{(I_d - \text{OFFSET})}{(\text{SLOPE})};$$

wherein the value OFFSET and the value SLOPE are determined using the values of the first input test voltage, the first measured current level, the second input test voltage, and the second measured current level.

7. The method, as set forth in claim 1, wherein the logic means comprises a microcontroller and the information storage means comprises EEPROM of the microcontroller.

8. A method of configuring a linear driver system to enable such system to deliver a desired current level ($I_d$) through a load, the linear driver system including a microcontroller connected to an input line of a linear driver circuit, the microcontroller including associated memory, the method comprising the steps of:

(a) connecting a predetermined test load to the linear driver circuit;

(b) connecting a test electrical energy source to the linear driver circuit;

(c) providing a predetermined input test voltage ($V_{t1}$) to the input line of the linear driver circuit and measuring a corresponding current level ($I_{t1}$) through the test load in response thereto;

(d) providing a predetermined input test voltage ($V_{t2}$) to the input line of the linear driver circuit and measuring a corresponding current level ($I_{t2}$) through the test load in response thereto;

(e) storing the measured current level ($I_{t1}$) in the memory associated with the microcontroller;

(f) storing the measured current level ($I_{t2}$) in the memory associated with the microcontroller; and (g) programming the microcontroller to determine an input voltage ($V_i$) which will result in the delivery of the desired current level ($I_d$) to the load in accordance with the equation:

$$V_i = \frac{(I_d - \text{OFFSET})}{(\text{SLOPE})};$$

wherein the value OFFSET and the value SLOPE are determined from the values ($V_{t1}$), ($V_{t2}$), ($I_{t1}$) and ($I_{t2}$).

9. The method, as set forth in claim 8, wherein:

$$\text{SLOPE} = \frac{(I_{t1} - I_{t2})}{(V_{t1} - V_{t2})}.$$

10. The method, as set forth in claim 8, wherein:

$$\text{OFFSET} = I_{t1} - \frac{(I_{t1} - I_{t2})(V_{t1})}{(V_{t1} - V_{t2})}.$$

11. The method, as set forth in claim 8, wherein in step (e) the measured current level ($I_{t1}$) is stored at a first predetermined location in the memory and in step (f) the measured current level ($I_{t2}$) is stored at a second predetermined location in the memory.

12. The method, as set forth in claim 11, wherein in step (g) the microcontroller is programmed to refer to both the first predetermined memory location and the second predetermined memory location when determining the input voltage ($V_i$).

13. A calibrated linear driver system, comprising:

a linear driver circuit including an input line;

an electrical energy source connected to the linear driver circuit;

a load connected to the linear driver circuit;

a microcontroller connected to the input line of the linear driver circuit and having memory associated therewith, the memory including at least two calibration current levels ($I_{t1}$) and ($I_{t2}$) stored therein, each calibration current level being specific to the linear driver circuit, the microcontroller programmed to determine a desired load current ($I_d$) and to determine and effect application of a corresponding necessary input voltage ($V_i$) to the linear driver circuit, wherein the necessary input voltage ($V_i$) is determined in accordance with the following equation:

$$V_i = \frac{(I_d - \text{OFFSET})}{(\text{SLOPE})};$$

wherein the value of OFFSET and the value of SLOPE are determined with reference to the stored calibration current levels ($I_{t1}$) and ($I_{t2}$).

14. A method of calibrating a linear driver system including logic means operatively connected to an input line of a linear driver circuit, the linear driver circuit configured to deliver a current from an electrical energy source to a load when the electrical energy source and load are connected thereto, the level of the delivered current being proportional to an input voltage applied to the input line by the logic means, the logic means including information storage means associated therewith, the method comprising the steps of:

(a) assembling the linear driver circuit;

(b) connecting a predetermined test load to the linear driver circuit;

(c) connecting a test electrical energy source to the linear driver circuit;

(d) applying a first input test voltage to the input line of the linear driver circuit and measuring a corresponding first current level through the test load in response thereto;

(e) applying a second input test voltage to the input line of the linear driver circuit and measuring a corresponding second current level through the test load in response thereto;

(f) storing the first measured current level in the information storage means;

(g) storing the second measured current level in the information storage means; and (h) programming the linear driver circuit to determine an input voltage which will result in the delivery of a desired current level, in response to said first and said second input test voltage and corresponding said first and said second current level, thereby calibrating the linear driver system.

* * * * *